(12) United States Patent
Soma et al.

(10) Patent No.: US 6,352,477 B1
(45) Date of Patent: Mar. 5, 2002

(54) SIGNAL INPUT DEVICE APPLICABLE TO CONTROLLERS FOR GAME MACHINES

(75) Inventors: Masahiro Soma; Toshio Furudate, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/624,717

(22) Filed: Jul. 25, 2000

(30) Foreign Application Priority Data

Jul. 27, 1999 (JP) .......................................... 11-212860

(51) Int. Cl.⁷ ................................................ A63F 9/24
(52) U.S. Cl. ........................................ 463/36; 345/161
(58) Field of Search ............................. 463/36, 37, 38; 345/161, 157, 156, 163

(56) References Cited

U.S. PATENT DOCUMENTS

| | | | | |
|---|---|---|---|---|
| 5,853,326 A | * | 12/1998 | Goto et al. ................... 463/37 |
| 5,889,507 A | * | 3/1999 | Engle et al. ................. 345/161 |
| 6,087,925 A | * | 7/2000 | Devolpi ....................... 338/92 |
| 6,102,802 A | * | 8/2000 | Armstrong .................... 463/37 |
| 6,184,866 B1 | * | 2/2001 | Schrum et al. ............. 345/161 |
| 6,186,896 B1 | * | 2/2001 | Takeda et al. ................ 463/38 |
| 6,189,401 B1 | * | 2/2001 | Atwell et al. .......... 74/471 XY |

* cited by examiner

Primary Examiner—Valencia Martin-Wallace
Assistant Examiner—Kim T. Nguyen
(74) Attorney, Agent, or Firm—Brinks Hofer Gilson & Lione

(57) ABSTRACT

A signal input device having control levers projected out of an upper case, and a movement transmitting member movable with movement of each control transmitting member so as to change the resistance value of corresponding resistance elements by changing the contact area between the resistance element and the electrically conductive rubber in accordance with the movement of the movement transmitting member.

3 Claims, 9 Drawing Sheets

AMOUNT OF MOVEMENT OF ACTUATING POINT P

SIGNAL INPUT DEVICE APPLICABLE TO CONTROLLERS FOR GAME MACHINES

BACKGROUND OF THE INVENTION

1. Field of the Invention

The present invention relates to a signal input device for inputting a signal to an electronic device upon operation of a control, the signal input device being suitably used as, for example, a controllers for game machines.

2. Description of the Related Art

FIG. 7 is an exploded perspective view of a controller 100 used as a signal input device for game machines, which has been previously developed by the assignee of the present invention. Referring to FIG. 7, numeral 10 denotes an upper case constituting an upper side of a housing of the controller 10, and 20 denotes a lower case constituting a lower side of the controller housing. Also, numeral 30 denotes a flexible board arranged in an inner space defined by the upper case 10 and the lower case 20, and 40 denotes a plate used for pressing the flexible board 30 to be fixed to an inner surface of the upper case 10.

On an upper surface of the upper case 10, a cross key (digital control) 11 is provided at one end and a key top (digital control) 12 comprising four kinds of keys is provided at the other end. Holes 14, 14 are formed in the upper case 10 at an end on the rear side (closer to the player). Control levers 22, 22 serving as controls, described later, are inserted respectively through the holes 14, 14 such that their heads project out of the upper surface of the upper case 10.

The plate 40 is attached to the lower case 20, and the flexible board 30 is attached onto the plate 40. Further, the lower case 20 is provided with a connector (not shown) connected to a cable 23 for taking out a signal from the flexible board 30.

An analog input section of the controller 100 will be described below. Note that two control levers 22 are provided, but the following description is made of one control lever 22.

First, as shown in FIG. 8, the control lever 22 is disposed above the flexible board 30, and mainly comprises a tubular stick 22a and a substantially disk-shaped stick knob 22b provided at an upper end of the stick 22a in coaxial relation. A larger-diameter pressing portion 22d is formed at a lower end of the stick 22a.

Then, a skirt-shaped movement transmitting member 45 is fixedly attached in surrounding relation to the stick 22a, and four fitting recesses 45a are provided in a lower surface (surface on the side closer to the lower case 20) of the movement transmitting member 45 with equal angular intervals. The fitting recesses 45a are fitted respectively to projections 51a of support members 51 each supporting an electrically conductive rubber 50 which serves as an electrically conductive elastic member.

The support member 51 has an attachment surface 51b for the electrically conductive rubber 50 on the side facing the flexible board 30, and also has the projection 51a provided on the same side as the movement transmitting member 45. The electrically conductive rubber 50 having a pyramid-shaped fore end is attached to the attachment surface 51b.

The projections 51a of the support members 51 are fitted respectively to the corresponding fitting recesses 45a provided in the movement transmitting member 45, whereby the four electrically conductive rubbers 50 are provided on the movement transmitting member 45. Further, as shown in FIG. 7, the four support members 51 including the electrically conductive rubbers 50 attached thereto are arranged to lie in four directions, i.e., in the +X-, −X-, +Y- and −Y-directions, about a neutral axis N of the control lever 22.

On the other hand, as shown in FIGS. 7 and 8, resistance elements 60 are formed on an upper surface of the flexible board 30 in one-to-one facing relation to the positions of the electrically conductive rubbers 50 provided on the movement transmitting member 45 which is arranged above the upper surface of the flexible board 30. Holes 72 are formed in the flexible board 30 in positions facing the pressing portions 22d provided at the lower ends of the sticks 22a of the control levers 22 such that coil springs 71 placed in the holes 72 are projected from the side of the plate 40 toward the side of the control lever 22. Further, push switches 32, 34 are disposed on the flexible board 30 at positions respectively facing individual keys of the cross key 11 and the key top 12.

The push switches 32, 34 are each a digital switch comprising, though not shown, an upper contact and a lower contact which are each made of electrically conductive rubber or the like and are arranged within a dome-shaped member made of rubber or the like in mutually facing relation. When the switch is pressed externally of the dome-shaped member, the upper contact and the lower contact are contacted with each other for ON/OFF control. Thus, by operating the individual keys of the cross key (digital control) 11 and the key top (digital control) 12 provided on the upper surface of the upper case 10, a digital signal from the operated one of the push switches 32, 34 is inputted to the game machine through the flexible board 30 and the cable 23.

An assembled state of the analog input section will be described below.

In the assembled state, as shown in FIG. 8, the control lever 22 is arranged such that a lower end portion of the stick 22a is positioned in the inner space defined between the upper cover 10 and the plate 40, and the stick knob 22b is projected out of the hole 14 formed in the upper cover 10. Also, an upper end of the coil spring 71 projecting out of the plate 40 is fitted to the pressing portion 22d provided at the lower end of the stick 22a. With the stick 22a biased upward under a biasing force of the coil spring 71, an upper surface of a skirt portion 45b of the movement transmitting member 45 fixedly attached around the stick 22a is biased in the above inner space so as to abut with an inner wall surface 10a of the upper cover 10 surrounding the hole 14, whereby the control lever 22 is held in a neutral position.

Further, when the control lever 22 is in the neutral position, i.e., in the inoperative state, a gap is left between the electrically conductive rubber 50 provided on the attachment surface 51b of the support member 51, which is attached to the movement transmitting member 45, and the resistance element 60 formed on the upper surface of the flexible board 30, so that a planar analog switch is constructed between them.

The operation of the analog input section will be described below.

The above-mentioned analog switch is constructed to be able to change the amount of resistance with a change in contact area between the electrically conductive rubber 50 and the resistance element 60 depending on the azimuth and the tilt angle in and through which an actuating point P of the control lever 22, shown in FIG. 9, is moved from the neutral axis N. More specifically, the electrically conductive rubber 50 has a smaller resistance value per unit area than the resistance element 60. Therefore, as the contact area increases, the resistance value of the resistance element 60 (combined with the electrically conductive rubber 50) is reduced and a current flowing through the resistance element 60 (including the electrically conductive rubber 50) is increased.

For example, when the control lever 22 is in the inoperative state shown in FIG. 8, the actuating point P of the control lever 22 lies on the neutral axis N, and the four electrically conductive rubbers 50 attached to the movement transmitting member 45 are not contacted with the corresponding resistance elements 60 as shown. In this condition, therefore, the resistance value of the resistance element 60 is not changed and a current in the normal state flows.

Then, when the control lever 22 is tilted in the −X-direction as shown in FIG. 9, the actuating point P of the control lever 22 is moved in the −X-direction to a position shifted from the neutral axis N at which the actuating point P has been positioned in the inoperative state. At this time, the electrically conductive rubber 50 attached to the movement transmitting member 45 and positioned in the −X-direction is pressed by the movement transmitting member 45 to be brought into contact with the corresponding resistance element 60 as shown in FIGS. 9 and 10. On the other hand, the electrically conductive rubbers 50 positioned in the +X-, −Y-, and +Y-directions are not contacted with the corresponding resistance elements 60. In this case, therefore, the resistance value provided by a combination of the electrically conductive rubber 50 in the −X-direction and the corresponding resistance element 60 is changed, whereas the resistance values provided by combinations of the electrically conductive rubbers 50 positioned in the +X-, −Y-, and +Y-directions and the corresponding resistance elements 60 are not changed and the current in the normal state flows.

When the control lever 22 is tilted midway between the −X- and −Y-directions, the actuating point P of the control lever 22 is moved midway between the −X- and −Y-directions to a position shifted from the neutral axis N at which the actuating point P has been positioned in the inoperative state. At this time, the electrically conductive rubbers 50 attached to the movement transmitting member 45 and positioned in the −X- and −Y-directions are pressed by the movement transmitting member 45 to be brought into contact with the corresponding resistance elements 60, but the contact area in this case is smaller than that in the case of tilting the control lever 22 in the −X-direction only as shown in FIG. 9. Accordingly, the resistance value is larger than the case of tilting the control lever 22 in the −X-direction only, and a smaller current flows. On the other hand, the electrically conductive rubbers 50 positioned in the +X- and +Y-directions are not contacted with the corresponding resistance elements 60. Therefore, the resistance values provided by combinations of the electrically conductive rubbers 50 positioned in the +X- and +Y-directions and the corresponding resistance elements 60 are not changed and the current in the normal state flows.

Thus, the analog input section can detect the azimuth and the tilt angle in and through which the actuating point P of the control lever 22 has been moved, by measuring voltage changes in accordance with analog changes in currents flowing through the resistance elements 60. Then, the analog input section can input detected signals, as analog signals, to the game machine through the flexible board 30 and the cable 23.

Next, the points to be improved in the above-described analog input section of the controller 100 will be described.

As one point, the control lever 22 is not supported such that the center of tilting of the control lever 22 will not move.

Therefore, when the actuating point P is tilted in the −X-direction as shown in FIG. 9, the control lever 22 is caused to translate due to a play between the pressing portion 22d formed at the lower end of the stick 22a and the coil spring 71, a deformation of the coil spring 71 in the −X-direction at the position of the pressing portion 22d, etc. This means that the fore end of the electrically conductive rubber 50 on the support member 51 attached to the movement transmitting member 45, which is in turn fixedly attached to the stick 22a, is not determined in its position as desired. Accordingly, as shown in FIG. 11, the position (indicated by arrow in the drawing) of the fore end of the electrically conductive rubber 50 may deviate from the center of the resistance element 60 to such an extent that, when the electrically conductive rubber 50 is pressed against the resistance element 60, the electrically conductive rubber 50 comes outside the edge of the resistance element 60 in the −X-direction and protrudes over the flexible board 30. In such a condition, the change in the resistance value is reduced and saturated even with further pressing of the electrically conductive rubber 50 because a contact area S' in the condition of FIG. 11 is smaller than a contact area S resulted when the electrically conductive rubber 50 is completely contacted with the resistance element 60 as shown in FIG. 10.

The above problem can be overcome by setting the resistance element 60 to have a greater length beforehand in consideration of that the position of the electrically conductive rubber 50 may deviate with respect to the resistance element 60. This solution however increases ineffective resistance and hence the resistance value of the resistance element 60 itself. Correspondingly, the current flowing through the resistance element 60 in the inoperative state is reduced and the produced voltage is lowered, thus resulting in reduced detection sensitivity of the analog signal. For those reasons, the above solution cannot be employed.

Furthermore, when the contact area between the electrically conductive rubber 50 and the resistance element 60 is increased, the pyramid-shaped fore end of the electrically conductive rubber 50 is contacted with the resistance element 60 such that the electrically conductive rubber 50 is pressed through the attachment surface 51b of the support member 51 so as to spread from the center of the resistance element 60 in opposite directions. However, when the actuating point P of the control lever 22 approaches a maximum limit of the movable range thereof, the amount of deformation of the electrically conductive rubber 50 is increased and a greater operating force is required to further compress the electrically conductive rubber 50.

Moreover, as shown in FIG. 8, when the control lever 22 is in the inoperative state, there is a gap left between the electrically conductive rubber 50 and the corresponding resistance element 60. This arrangement produces a dead zone in which the resistance value of the resistance element 60 (combined with the electrically conductive rubber 50) is not changed with initial movement of the actuating point P of the control lever 22.

As still another problem, when the resistance element 60 having a rectangular shape is used, there occurs a region in which the amount of movement of the actuating point P is not proportional to the resistance value of the resistance element 60 (i.e., linearity in relationship between them is deteriorated), during the process in which the electrically conductive rubber 50 is compressed with the movement of the actuating point P of the control lever 22. This problem is attributable to the fact that a compressive force applied to the pyramid-shaped electrically conductive rubber 50 and an elongation of the electrically conductive rubber 50 over the resistance element 60 are not always changed in linear relation. If it is attempted to modify the shape of the electrically conductive rubber 50 such that the amount of movement of the actuating point P is proportional to the resistance value of the resistance element 60, very difficult works would be necessitated to analyze deformations of the electrically conductive rubber 50 and obtain an optimum shape thereof.

SUMMARY OF THE INVENTION

It is an object of the present invention is to provide a signal input device which can certainly and fixedly hold the position of an electrically conductive rubber with respect to a resistance element, which can reduce a force required for operating a control, which can change the resistance value of the resistance element from an initial stage of movement of the control, which can change the resistance value of the resistance element substantially in proportion to the amount of movement of an actuating point of the control, and which can be applied to a controller for game machines.

To achieve the above object, according to the present invention, there is provided a signal input device for inputting a signal to an electronic device, wherein the signal input device comprises a control projecting out of a housing, a plurality of electrically conductive elastic members disposed in the housing and displaced depending on movement of the control, and a board disposed in the housing and having a plurality of resistance elements formed corresponding to the electrically conductive elastic members, the electrically conductive elastic members being able to change resistance values of the resistance elements by changing contact areas between the resistance elements and the electrically conductive elastic members, a part of each of the electrically conductive elastic members being rotatably supported on the board, whereby an analog signal corresponding to the resistance value of each of the resistance elements is inputted to the electronic device.

In the above signal input device, preferably, the electrically conductive elastic members are each held by a holding member having one end rotatably supported by a support provided on the board, and the electrically conductive elastic members are each pressed with rotation of the holding member to contact the resistance element over a gradually-increasing contact area from one edge to the other edge thereof, thereby changing the resistance value of the resistance elements.

In the above signal input device, preferably, the control is provided with a movement transmitting member movable upon movement of the control, a part of the movement transmitting member is held in abutment with the holding member, and the holding member is rotated with movement of the movement transmitting member to displace the electrically conductive elastic member.

In the above signal input device, preferably, the resistance elements are each constituted as a rectangular pattern, and the rectangular pattern is modified in shape for correction such that the resistance value of the resistance element is changed substantially linearly.

In the above signal input device, preferably, the device includes two sets of combination of the control and the plurality of electrically conductive elastic members displaced depending on movement of the control, the board includes the plurality of resistance elements provided for each of the two sets of combination of the control and the plurality of electrically conductive elastic members, and the analog signal is inputted to a game machine given as the electronic device, whereby the signal input device serves as a controller for the game machine.

DESCRIPTION OF THE PREFERRED EMBODIMENT

Figure 1:
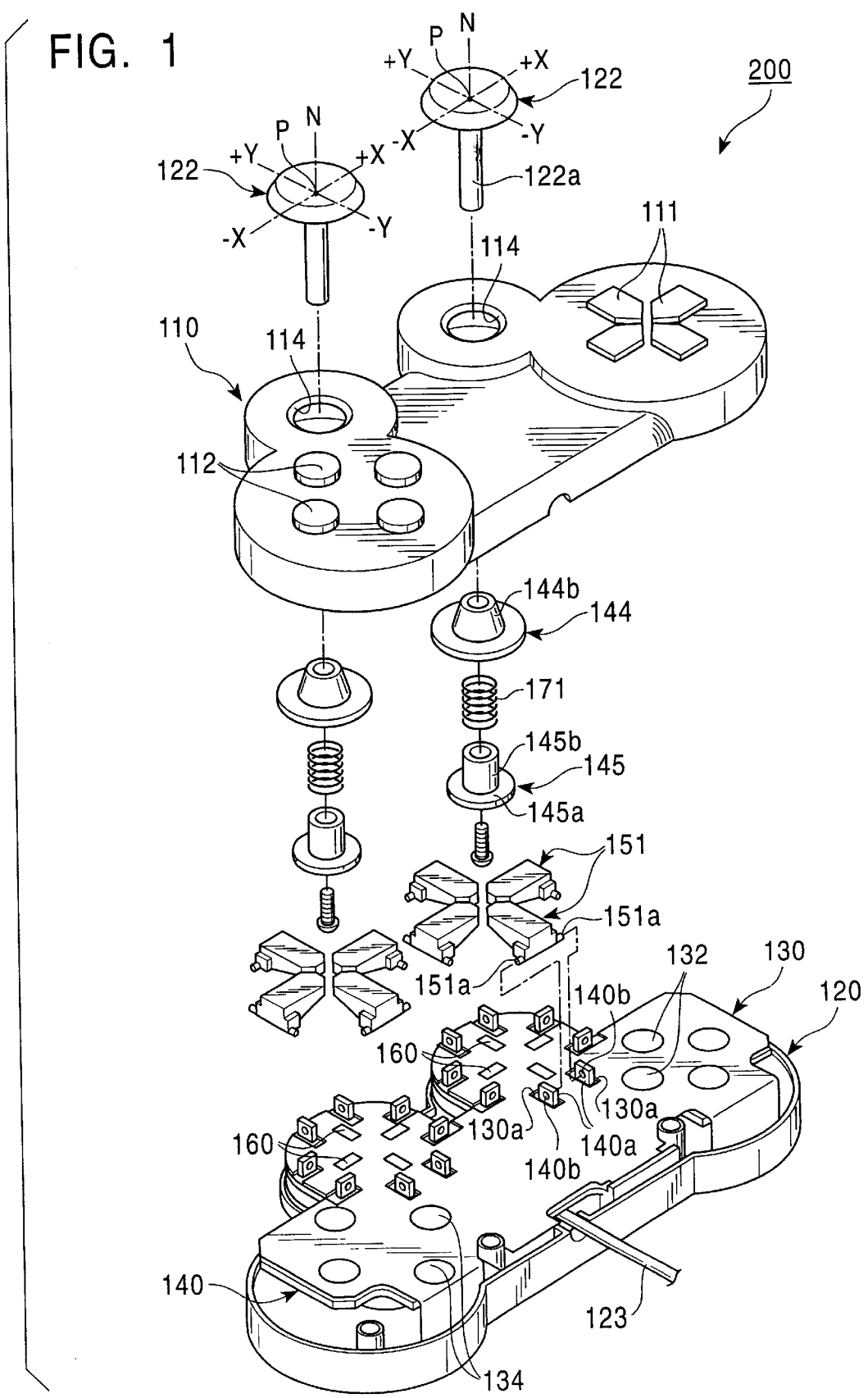
FIG. 1 is an exploded perspective view of a signal input device according to an embodiment of the present invention.

FIG. 1 is an exploded perspective view of a controller 200 used as a signal input device according to an embodiment of the present invention. Referring to FIG. 1, numeral 110 denotes an upper case constituting an upper side of a housing of the controller 110, and 120 denotes a lower case constituting a lower side of the controller housing. Also, numeral 130 denotes a flexible board arranged in an inner space defined by the upper case 110 and the lower case 120, and 140 denotes a plate used for pressing the flexible board 130 to be fixed to an inner surface (not shown) of the upper case 110.

On an upper surface of the upper case 110, a cross key (digital control) 111 is provided at one end and a key top (digital control) 112 comprising four kinds of keys is provided at the other end. Holes 114, 114 are formed in the upper case 110 at an end on the rear side (closer to the player) . Control levers 122, 122 serving as controls, described later, are inserted respectively through the holes 114, 114 such that their heads project out of the upper surface of the upper case 110.

The plate 140 is attached to the lower case 120, and the flexible board 130 is attached onto the plate 140. Further, the lower case 120 is provided with a connector (not shown) connected to a cable 123 for taking out a signal from the flexible board 130.

An analog input section of the controller 100 will be described below. Note that two control levers 122 are provided, but the following description is made of one control lever 122.

Figure 2:
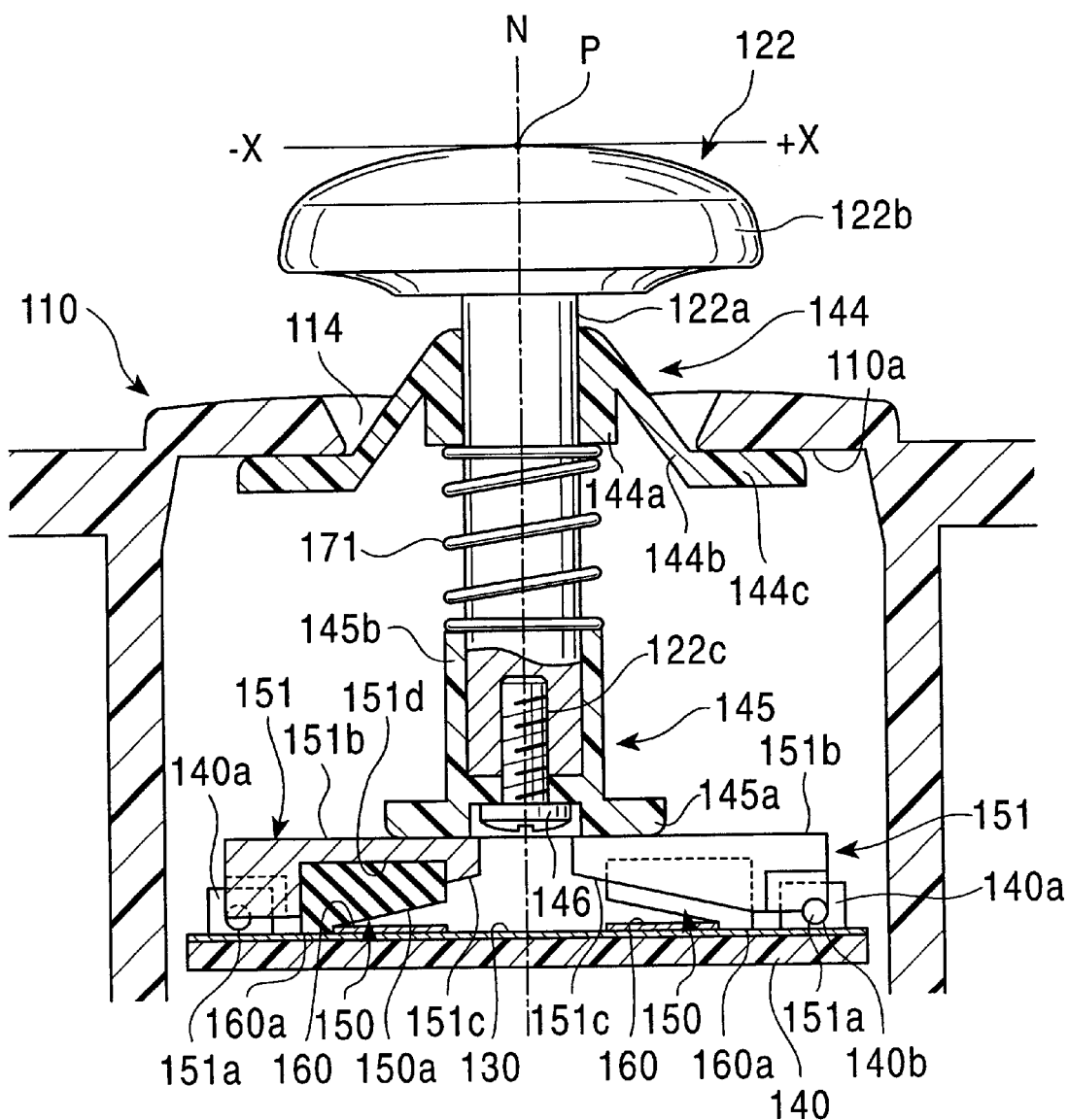
FIG. 2 is a partial sectional view showing the inoperative state of a control lever provided in the signal input device according to the embodiment of the present invention.

First, the control lever 122 is disposed above the flexible board 130 and mainly comprises, as shown in FIG. 2, a tubular stick 122a and a substantially disk-shaped stick knob 122b provided at an upper end of the stick 122a in coaxial relation. A screw tightened hole 122c is formed at a lower end surface of the stick 122a.

Also, as shown in FIG. 1, a movement transmitting member 145 is disposed coaxially with the stick 122a. The movement transmitting member 145 comprises a slide member 144 having a tubular portion 144a (see FIG. 2) and a skirt portion 144b formed around the slide member 144, a coil spring 171, a disk-shaped movement transmitting portion 145a, and a tubular portion 145b vertically provided on the movement transmitting portion 145a.

Then, as shown in FIG. 2, the slide member 144 is slidably attached to the stick 122a by inserting the stick 122a through the tubular portion 144a of the slide member 144. Subsequently, the coil spring 171 is fitted over the stick 122a below the slide member 144, and the tubular portion 145a of the movement transmitting member 145 is further fitted over the stick 122a below the coil spring 171 with the coil spring 171 located between both the tubular portions 144a, 145a. A screw 146 is then tightened into the screw tightened hole 122c of the stick 122a from below the movement transmitting member 145, whereby the movement transmitting member 145 is fixedly attached to the lower end of the stick 122a.

On the other hand, as shown in FIG. 1, four rectangular resistance elements 160 are disposed on an upper surface of the flexible board 130 in a cross pattern about a neutral axis N of the control lever 122. Further, the four resistance elements 160 are oriented such that their longitudinal axes lie respectively in four directions, i.e., in the +X-, −X-, +Y- and −Y-directions, about the neutral axis N.

For each of the resistance elements 160, a pair of support lugs 140a, 140a serving as supports for a holding member 151 (described later) are vertically provided on the plate 140 so as to extend parallel to the longitudinal axis of the resistance element 160 and to position outside one end of the resistance element 160. At central portions of the pair of support members 140a, 140a, through holes 140b, 140b are coaxially formed to penetrate the support members 140a, 140a respectively in the transverse direction of the resistance element 160. Additionally, a cutout 130a is formed in the flexible board 130 in surrounding relation to each support member 140a so that the support member 140a may project upward of the flexible board 130 through the cutout 130a.

Above the four resistance elements 160 arranged in a cross pattern, four holding members 151 are disposed in one-to-one facing relation to the four resistance elements 160. An electrically conductive rubber 150 (described later) is held by each holding member 151, and a pair of shafts 151a, 151a are projected from one end portion of the holding member 151 in opposed relation in the transverse direction thereof.

As shown in FIG. 2, the holding member 151 has a substantially rectangular upper surface 151b which is positioned on the side closer to the control lever 122 and is arranged to extend substantially parallel to the upper surface of the flexible board 130, and a slope 151c which is positioned on the side closer to the flexible board 130 and is inclined such that a spacing between the slope and the upper surface of the flexible board 130 is gradually increased as the slope approaches the neutral axis N. Also, a holding portion 151d in the form of a recessed hole is formed in the slope 151c of the holding member 151. The pair of shafts 151a, 151a provided at the one end portion of the holding member 151 are fitted respectively to the through holes 140b, 140b of the pair of support members 140a, 140a vertically provided on the plate 140, whereby the holding member 151 is supported rotatably about the through holes 140b, 140b of the support members 140a, 140a.

Further, the electrically conductive rubber 150 is embedded in the holding portion 151d of the holding member 151. The electrically conductive rubber 150 has a slope 150a which is projected out of the holding portion 151d and is extended substantially parallel to the slope 151c of the holding member 151.

On the other hand, as shown in FIG. 1, push switches 132, 134 are disposed on the flexible board 130 at positions respectively facing individual keys of the cross key 111 and the key top 112.

The push switches 132, 134 are each a digital switch comprising, though not shown, an upper contact and a lower contact,which are each made of electrically conductive rubber or the like and are arranged within a dome-shaped member made of rubber or the like in mutually facing relation. When the switch is pressed externally of the dome-shaped member, the upper contact and the lower contact are contacted with each other for ON/OFF control. Thus, by operating the individual keys of the cross key (digital control) 111 and the key top (digital control) 112 provided on the upper surface of the upper case 110, a digital signal from the operated one of the push switches 132, 134 is inputted to the game machine through the flexible board 130 and the cable 123.

An assembled state of the analog input section will be described below.

In the assembled state, as shown in FIG. 2, the control lever 122 is arranged such that a lower end portion of the stick 122a is positioned in the inner space defined between the upper cover 110 and the plate 140, and the stick knob 122b is projected out of the hole 114 formed in the upper cover 110. Also, the movement transmitting portion 145a of the movement transmitting member 145 fixedly attached to the lower end of the stick 122a has a lower surface held in abutment with the upper surfaces 151b of the four support members 151. Then, under a biasing force of the coil spring 171, an upper surface of a skirt portion 144c of the slide member 144, which is slidably attached to the stick 122a, is biased to abut with a rear surface of the upper cover 110, i.e., an inner wall surface 110a of the upper cover 110 surrounding the hole 114, while the upper surface of the skirt portion 144c is fitted at its base portion to the hole 114 of the upper cover 110. As a result, the control lever 122 is held in a neutral position (aligned with the neutral axis N) taken when it is in the inoperative state. Further, when the control lever 122 is in the neutral position, the upper surface 151b of each holding member 151 rotatably supported by the pair of support lugs 140a, 140a, which are vertically provided on the plate 140, is biased toward the flexible board 130 under the biasing force of the coil spring 171. At the same time, one end of the electrically conductive rubber 150 embedded in the holding portion 151d of the holding member 151, which end is positioned on the side closer to the support lugs 140a, is held in contact with an edge 160a of the resistance element 160 formed on the upper surface of the flexible board 130. Thus, a wedge-shaped gap is formed between the slope 150a of the electrically conductive rubber 150 and the resistance element 160 so that a planar analog switch is constructed between them. Further, in such a condition, the upper surface 151b of the holding member 151 is extended substantially parallel to the upper surface of the flexible board 130.

The operation of the analog input section will be described below.

The above-mentioned analog switch is constructed to be able to change the amount of resistance with a change in contact area between the electrically conductive rubber 150 and the resistance element 160 depending on the azimuth and the tilt angle in and through which an actuating point P of the control lever 122, shown in FIG. 1, is moved from the neutral axis N. More specifically, the electrically conductive rubber 150 has a smaller resistance value per unit area than the resistance element 160. Therefore, as the contact area increases, the resistance value of the resistance element 160 (combined with the electrically conductive rubber 150) is reduced and a current flowing through the resistance element 160 (including the electrically conductive rubber 150) is increased.

For example, when the control lever 122 is in the inoperative state shown in FIG. 2, the actuating point P of the control lever 122 lies on the neutral axis N, and the electrically conductive rubber 150 held by each of the holding members 151 is contacted only with the edge 160a of the corresponding resistance element 160. In this condition, therefore, the resistance value of the resistance element 60 is not changed and a current in the normal state flows.

Figure 3:
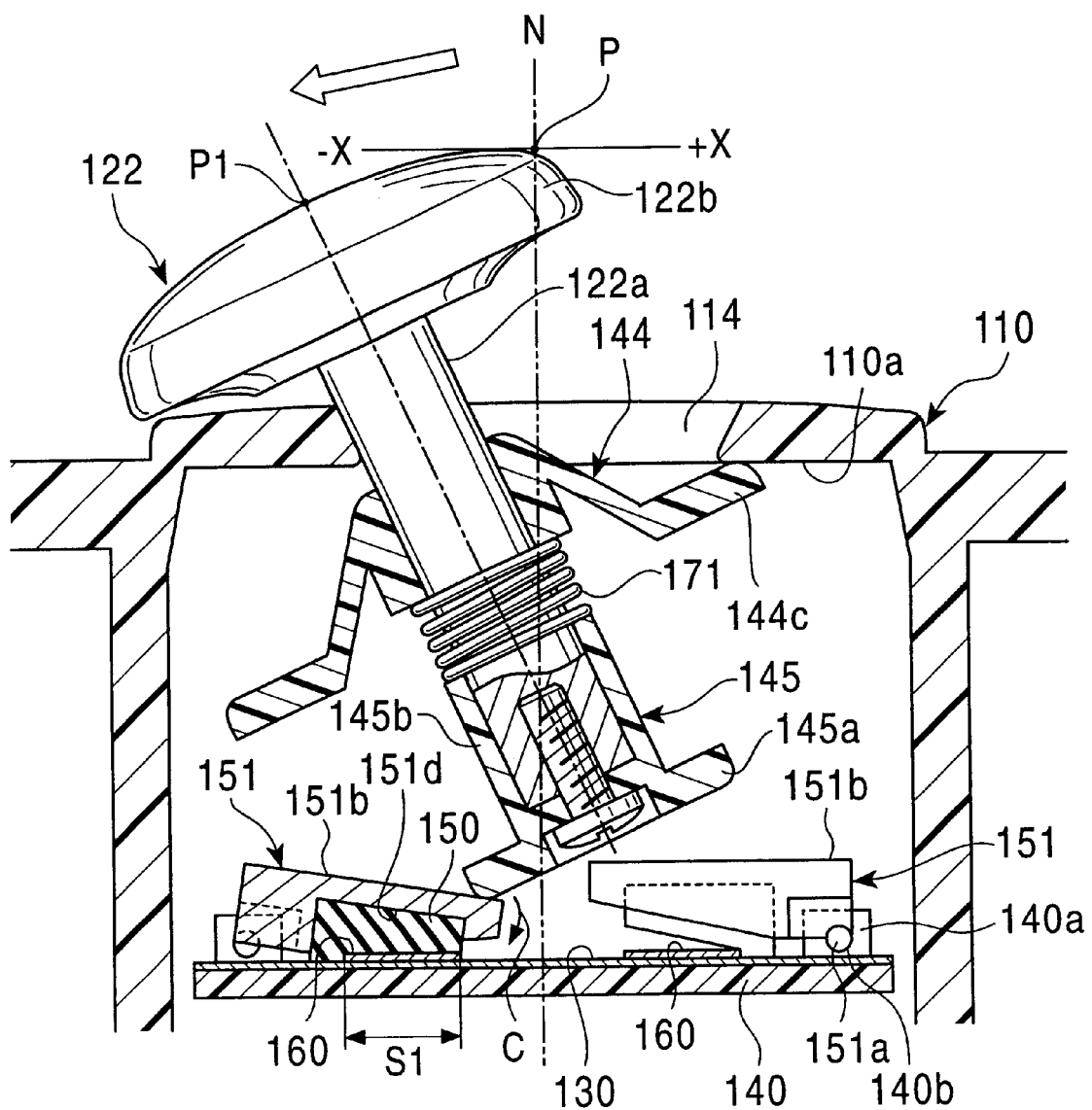
FIG. 3 is a partial sectional view showing one example of the state in which the control lever provided in the signal input device according to the embodiment of the present invention is tilted such that an actuating point of the control ever is moved away from a neutral axis thereof.

Then, when the control lever 122 is tilted in the −X-direction as shown in FIG. 3, the actuating point P of the control lever 122 is moved in the −X-direction to a position P1 shifted from the neutral axis N at which the actuating point P has been positioned in the inoperative state. At this time, the holding member 151 positioned in the −X-direction is pressed by the underside of the movement transmitting portion 145a of the movement transmitting member 145 in the direction of C indicated in the drawing. The electrically conductive rubber 150 is thereby brought into contact with the corresponding resistance element 160. On the other hand, the electrically conductive rubbers 150 positioned in the +X-, −Y-, and +Y-directions are not contacted with the corresponding resistance elements 60. In this case, therefore, the resistance value provided by a combination of the electrically conductive rubber 150 in the −X-direction and the corresponding resistance element 160 is changed, whereas the resistance values provided by combinations of the electrically conductive rubbers 150 positioned in the +X-, −Y-, and +Y-directions and the corresponding resistance elements 160 are not changed and the current in the normal state flows.

In the condition of FIG. 3, the movement transmitting member 145 abuts with the holding member 151, and the slide member 144 is slid in the direction to compress the coil spring 171 while an upper edge of the skirt portion 144c of the slide member 144 is pressed against the inner wall surface 110a of the upper case 110. Therefore, a pressing force can be applied from the movement transmitting member 145 to the holding member 151 by moving the actuating point P of the control lever 122 in the −X-direction, for example. Also, when the operation of the control lever 122 is ceased, the actuating point P is returned to the position of the neutral axis N again.

Figure 4:
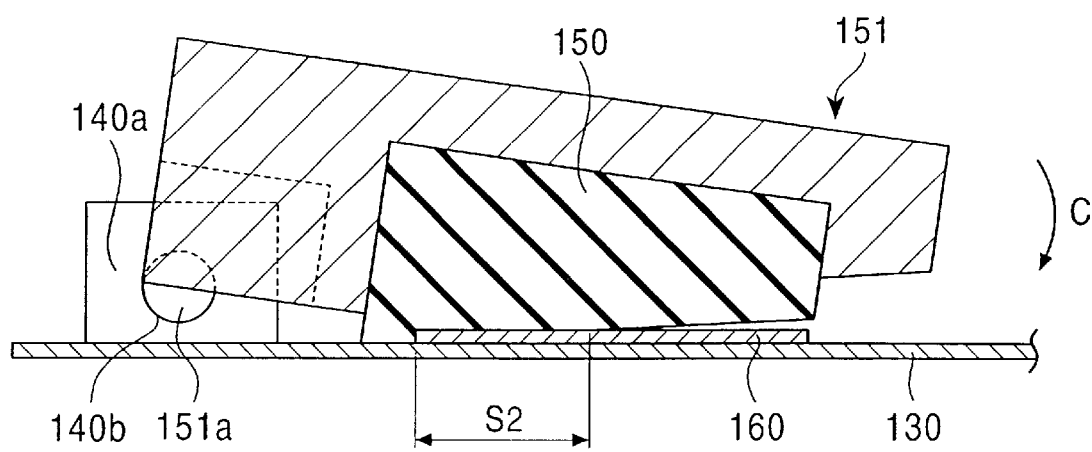
FIG. 4 is a partial sectional view showing one example of the condition of an electrically conductive rubber resulted when the control lever provided in the signal input device according to the embodiment of the present invention is tilted such that the actuating point of the control lever is moved away from the neutral axis thereof.

When the control lever 122 is tilted midway between the −X- and −Y-directions, the actuating point P of the control lever 122 is moved midway between the −X- and −Y-directions to a position shifted from the neutral axis N at which the actuating point P has been positioned in the inoperative state. At this time, the holding members 151 positioned in the −X- and −Y-directions are pressed by the movement transmitting member 145, and the electrically conductive rubbers 150 in those directions are brought into contact with the corresponding resistance elements 160 as shown in FIG. 4, but a contact area S2 in this case is smaller than a contact area S1 (see FIG. 3) in the case of tilting the control lever 122 in the −X-direction only. Accordingly, the resistance value is larger than the case of tilting the control lever 122 in the −X-direction only, and a smaller current flows. On the other hand, the electrically conductive rubbers 150 positioned in the +X- and +Y-directions are not contacted with the corresponding resistance elements 160. Therefore, the resistance values provided by combinations of the electrically conductive rubbers 150 positioned in the +X- and +Y-directions and the corresponding resistance elements 160 are not changed and the current in the normal state flows.

Thus, the analog input section can detect the azimuth and the tilt angle in and through which the actuating point P of the control lever 122 has been moved, by measuring voltage changes in accordance with analog changes in currents flowing through the resistance elements 160. Then, the analog input section can input detected signals, as analog signals, to the game machine through the flexible board 130 and the cable 123.

Figure 5A:
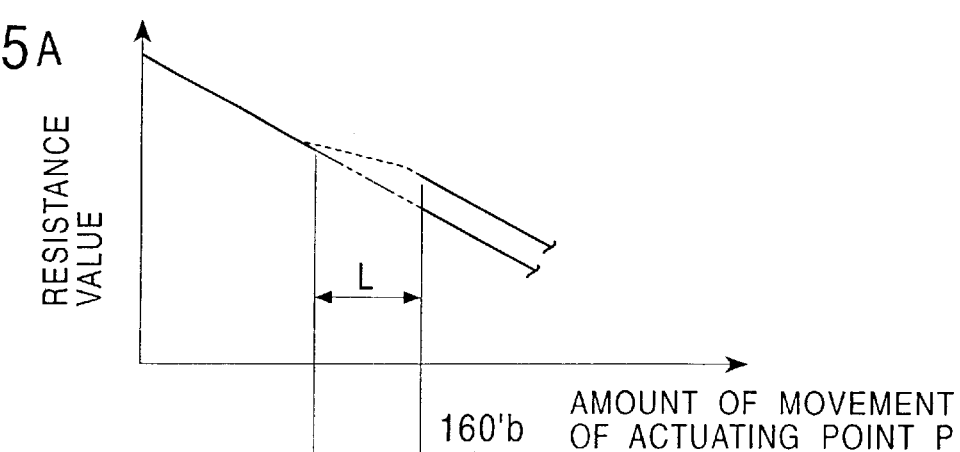
FIGS. 5A and 5B are explanatory views for explaining one way of changing the shape of the resistance element depending on the relationship between the amount of movement of the actuating point of the control lever and the resistance value in the signal input device according to the embodiment of the present invention.
Figure 5B:
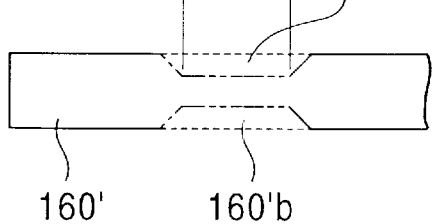

In the embodiment of the present invention, the electrically conductive rubber 150 is employed as an electrically conductive elastic member. Depending on materials, etc. of the electrically conductive rubber, however, a. change rate of the resistance value of the resistance element with respect to the amount of movement of the actuating point P of the control lever 122 is reduced as shown in FIG. 5A, thus giving rise to a region L in which those two parameters are not linearly changed. In such a case, as shown in FIG. 5B, recesses 160'b, 160'b are formed on both sides of a resistance element 160' in the transverse direction to provide a narrowed portion corresponding to the above region L. With this arrangement, the sectional area of the resistance element 160' in the transverse direction is reduced and the change rate of the resistance value is modified so as to increase in the region L.

Figure 6A:
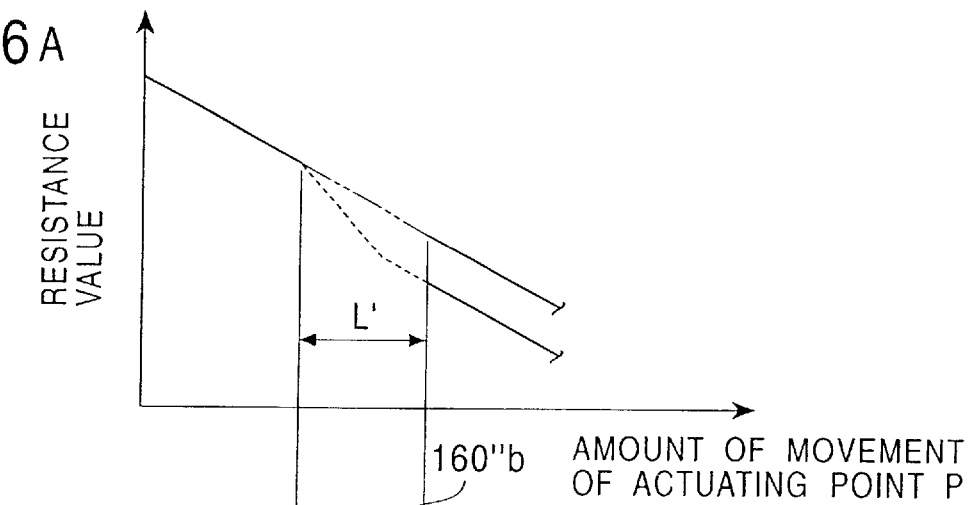
FIGS. 6A and 6B, are explanatory views for explaining another way of changing the shape of the resistance element depending on the relationship between the amount of movement of the actuating point of the control lever and the resistance value in the signal input device according to the embodiment of the present invention.
Figure 6B:
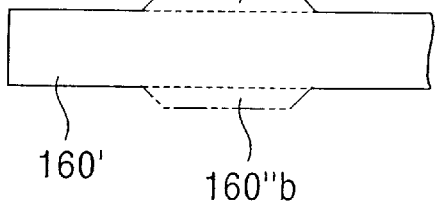
Figure 7:
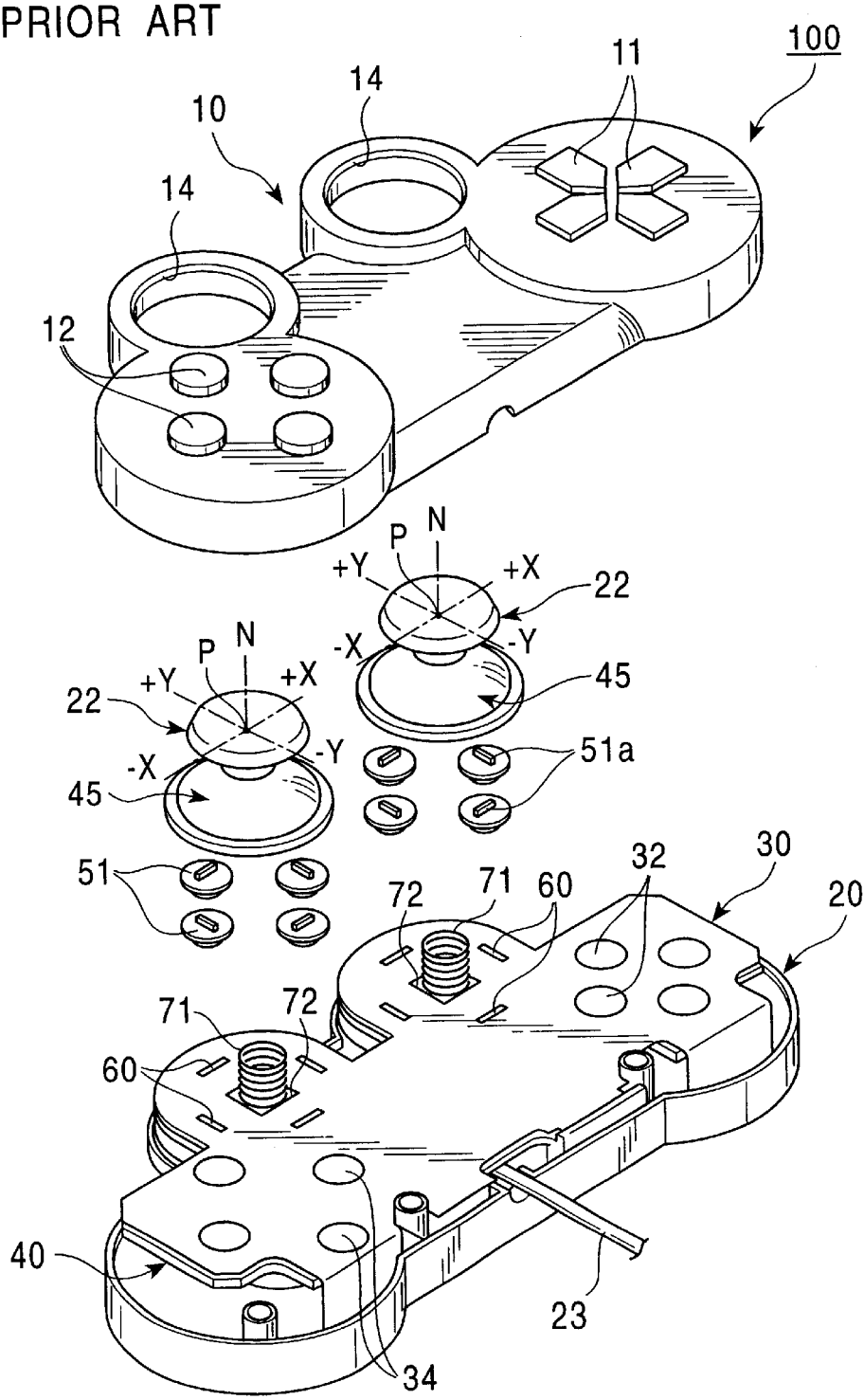
FIG. 7 is a partial exploded perspective view of a signal input device for game machines, which has been previously developed by the assignee of the present invention.
Figure 8:
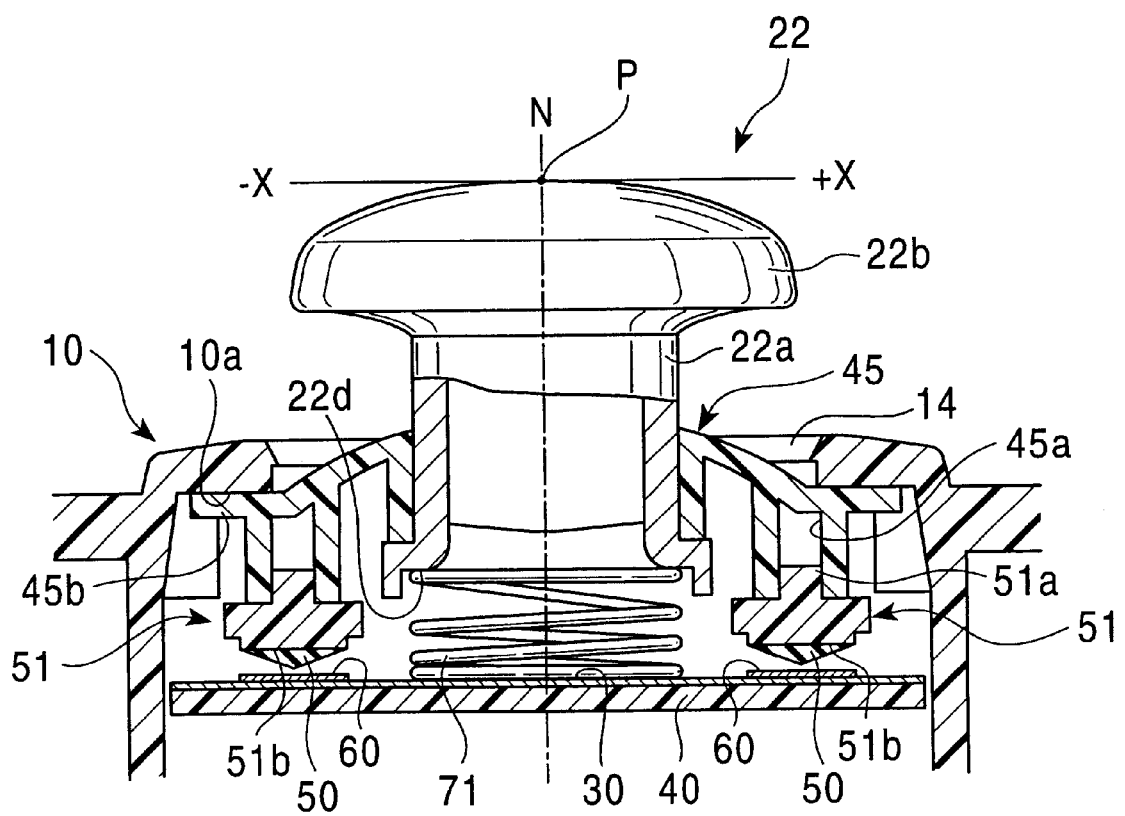
FIG. 8 is a partial sectional view showing the inoperative state of a control lever provided in the signal input device or game machines shown in FIG. 7.
Figure 9:
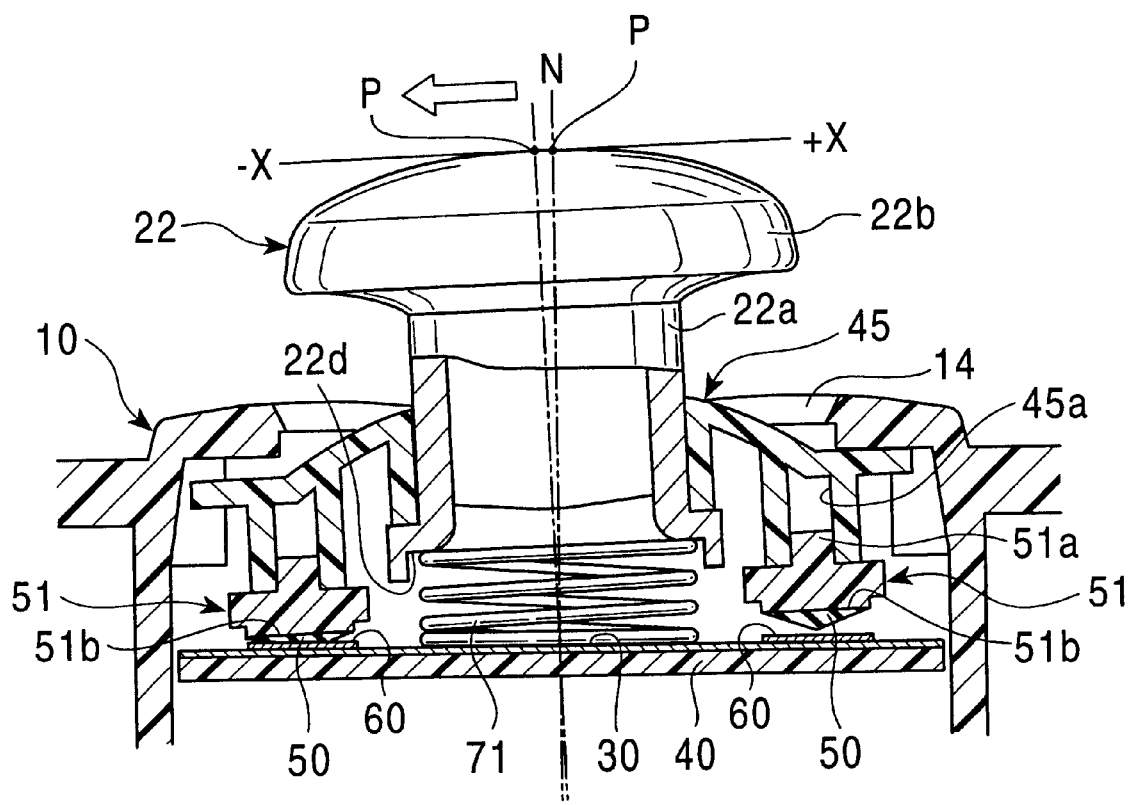
FIG. 9 is a partial sectional view showing one example of the state in which the control lever provided in the signal input device for game machines, shown in FIG. 7, is tilted such that an actuating point of the control lever is moved away from a neutral axis thereof.
Figure 10:
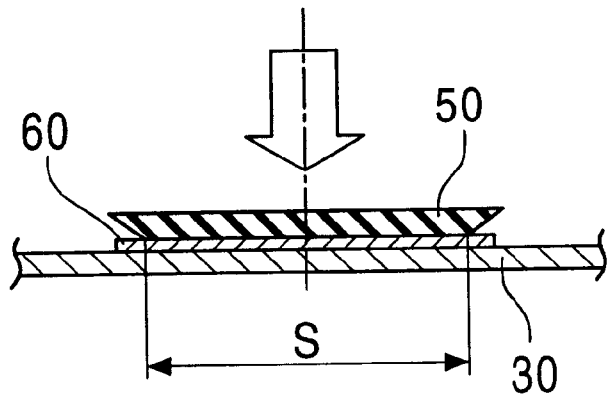
FIG. 10 is a partial sectional view showing one example of the condition of an electrically conductive rubber resulted when the control lever provided in the signal input device for game machines, shown in FIG. 7, is tilted such that the actuating point of the control lever is moved away from the neutral axis thereof.
Figure 11:
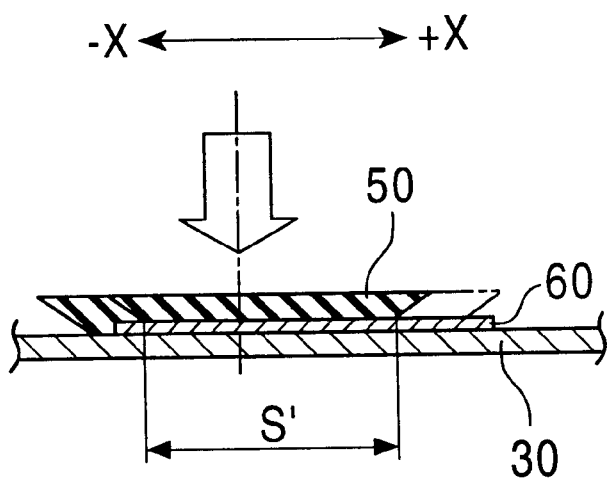
FIG. 11 is a partial sectional view showing another example of the condition of the electrically conductive rubber resulted when the control lever provided in the signal input device for game machines, shown in FIG. 7, is tilted such that the actuating point of the control lever is moved away from the neutral axis thereof.

Conversely, the change rate of the resistance value of the resistance element with respect to the amount of movement of the actuating point P may be increased as shown in FIG. 6A, thus giving rise to a region L' in which those two parameters are not linearly changed. In such a case, as shown in FIG. 6B, extensions 160"b, 160"b are formed on both sides of a resistance element 160" in the transverse direction to provide a bulged portion corresponding to the above region L'. With this arrangement, the sectional area of the resistance element 160" in the transverse direction is increased and the change rate of the resistance value is modified so as to decrease in the region L'.

A manner of modifying the change rate of the resistance value is not limited to the methods shown in FIGS. 5 and 6. For example, the shape and the number of the recesses 160'b or the extensions 160"b may be changed as needed, and the recesses or extensions may be formed on one side alone.

With the controller 200 used as the signal input device according to the embodiment of the present invention, as described above, one end of each holding member 151 holding the electrically conductive rubber 150 is rotatably supported by the pair of support lugs 140a, 140a vertically provided on the plate 140, as shown in FIG. 2. This arrangement is advantageous in that the position of the electrically conductive rubber 150 is positively determined relative to the resistance element 160, and the contact area between the resistance element 160 and the electrically conductive rubber 150 can be evenly changed while gradually increasing from one edge to the other edge of the resistance element 160. Also, even if there is a play allowing the control lever 122 to translate with respect to the resistance element 160 or in any of the +(−) X- and +(−) Y-directions and the intermediate directions therebetween, such a play will not impose an effect to change the position of the electrically conductive rubber 150. Accordingly, the necessity of forming the control lever 122 with high precision is avoided, and the controller 200 can be produced at a lower cost.

Further, when the control lever 122 is operated, the upper surface 151b of the holding member 151 is pressed at the other end thereof opposite to the one end at which the holding member 151 is rotatably supported, whereby the electrically conductive rubber 150 is compressed by the resistance element 160, as shown in FIG. 3. This arrangement is advantageous in that the operating force required for compressing the electrically conductive rubber 150 can be reduced based on the principle of the lever. As a result, a feel of operation is improved.

Further, the movement transmitting portion 145a of the movement transmitting member 145 fixedly attached to the lower end of the stick 122a is held in abutment with the upper surface 151b of each support member 151, movement of the movement transmitting member 145 caused upon movement of the actuating point P of the control lever 122 can be immediately transmitted to the holding member 151 holding the electrically conductive rubber 150. Hence, the resistance value of the resistance element 160 (combined with the electrically conductive rubber 150) can be changed just from initial movement of the actuating point P.

Moreover, as described in connection with FIGS. 5 and 6, even when there is a region in which the amount of movement of the actuating point P of the control lever 122 and the resistance value of the resistance element 160 are not linearly changed, the relationship between those two parameters can be calibrated to be kept substantially proportional by changing the shape of the resistance element 160 as required. This eliminates the necessity of complicated works such as analyzing deformations of the electrically conductive rubber 150.

Additionally, as mentioned above, the present invention is applicable to a controller for game machines.

One embodiment of the signal input device of the present invention has been described above with reference to the drawings, but detailed constructions are not limited to those of the embodiment. For example, the shape and the number of the control levers 122, the shape of the movement transmitting member 145, the shape and the number of the electrically conductive rubbers 150, etc. may be changed as needed. Also, the electrically conductive elastic member is not limited to the electrically conductive rubber 150, but may comprise, e.g., a metal sheet which is in the form of a leaf spring and has electrical conductivity in itself or includes an electrically conductive member formed on its surface.

According to the present invention, as described above, in a signal input device for inputting a signal to an electronic device, the signal input device comprises a control projecting out of a housing, a plurality of electrically conductive elastic members disposed in the housing and displaced depending on movement of the control, and a board disposed in the housing and having a plurality of resistance elements formed corresponding to the electrically conductive elastic members. The electrically conductive elastic members are able to change resistance values of the resistance elements by changing contact areas between the resistance elements and the electrically conductive elastic members. A part of each of the electrically conductive elastic members being rotatably supported on the board. An analog signal corresponding to the resistance value of each of the resistance elements is inputted to the electronic device. Therefore, the position of each electrically conductive elastic member can be positively determined relative to the resistance element, and the contact area between the resistance element and the electrically conductive elastic member can be evenly changed while gradually increasing from one edge to the other edge of the resistance element. Further, even if there is a play allowing the control to translate with respect to the resistance element, such a play will not impose an effect to change the position of the electrically conductive elastic member.

Also, the electrically conductive elastic members are each held by a holding member having one end rotatably supported by a support provided on the board, and the electrically conductive elastic members are each pressed with rotation of the holding member to contact the resistance element over a gradually-increasing contact area from one edge to the other edge thereof, thereby changing the resistance value of the resistance element. Therefore, a force required for operating the control can be reduced based on the principle of the lever.

Further, the control is provided with a movement transmitting member movable upon movement of the control, a part of the movement transmitting member is held in abutment with the holding member, and the holding member is rotated with movement of the movement transmitting member to displace the electrically conductive elastic member. Therefore, the movement of the movement transmitting member caused upon movement of the control can be immediately transmitted to the holding member holding the electrically conductive elastic member, and the resistance value of the resistance element can be changed just from initial movement of the control.

Moreover, the resistance elements are each constituted as a rectangular pattern, and the rectangular pattern is modified in shape for correction such that the resistance value of the resistance element is changed substantially linearly. Therefore, even when the use of the rectangular resistance element gives rise to a region in which the amount of movement of an actuating point of the control and the resistance value of the resistance element are not linearly changed, the relationship between those two parameters can be calibrated to be kept substantially proportional by modifying the shape of the resistance element pattern as required. Also, since it is not needed to change the shape of the electrically conductive elastic member, the necessity of complicated works such as analyzing deformations of the electrically conductive elastic member is eliminated.

Additionally, the signal input device includes two sets of combination of the control and the plurality of electrically conductive elastic members displaced depending on movement of the control, the board includes the plurality of resistance elements provided for each of the two sets of combination of the control and the plurality of electrically conductive elastic members, and the analog signal is inputted to a game machine given as the electronic device, whereby the signal input device serves as a controller for the game machine. Therefore, the present invention can be applied to controllers for the game machine.

What is claimed is:

1. A signal input device for inputting a signal to an electronic device, comprising a control projecting out of a housing, a plurality of electrically conductive elastic members disposed in said housing and displaced depending on movement of said control, and a board disposed in said housing and having a plurality of resistance elements formed corresponding to said electrically conductive elastic members and arranged in pairs radially around said control, said electrically conductive elastic members being able to change resistance values of said resistance elements by changing contact areas between said resistance elements and said electrically conductive elastic members, a part of each of said electrically conductive elastic members being rotatably supported on said board, wherein said electrically conductive elastic members are each held by a holding member having an outer end rotatably supported in a cantilevered manner by a support provided on said board at an outer position spaced away from said control, wherein said electrically conductive elastic members each have a surface that faces said resistance element, said surface being inclined and sloped away from said board when said control is in a neutral position, said slope being oriented such that an inner end of said surface is spaced further away from said board than an outer end of said surface, said inner end of said surface being closer to said control than said outer end of said surface, wherein a rotation of said holding member causes the surface of said electrically conductive elastic member to press against and contact said resistance element over a gradually-increasing contact area from an outer edge of said resistance element to an inner edge of said resistance element to thereby changing the resistance value of said resistance element, wherein said control is provided with a movement transmitting member that is movable in response to a movement of said control, a portion of said movement transmitting member being held in abutment with said holding member, said holding member being rotated by the movement of said movement transmitting member so as to cause said electrically conductive elastic member to press against and contact said resistance element, and whereby an analog signal corresponding to the resistance value of each of said resistance elements is inputted to said electronic device.

2. A signal input device according to claim 1, wherein said resistance elements are each constituted as a rectangular pattern, and the rectangular pattern is modified in shape for correction such that the resistance value of said resistance element is changed substantially linearly.

3. A controller for a game machine comprising a plurality of signal input devices according to claim 1, wherein the analog signal from each of said plurality of signal input devices is inputted to said game machine, and whereby said plurality of signal input devices serve as the controller for the game machine.

* * * * *